(12) United States Patent
Butler

(10) Patent No.: US 9,359,066 B2
(45) Date of Patent: Jun. 7, 2016

(54) APPARATUS AND METHOD FOR MAINTAINING A TENSION IN A CABLE CONTROL SYSTEM

(75) Inventor: Harris Butler, Towanda, KS (US)

(73) Assignee: LEARJET INC., Wichita, KS (US)

( * ) Notice: Subject to any disclaimer, the term of this patent is extended or adjusted under 35 U.S.C. 154(b) by 123 days.

(21) Appl. No.: 14/117,793

(22) PCT Filed: May 19, 2011

(86) PCT No.: PCT/IB2011/001084
§ 371 (c)(1),
(2), (4) Date: Nov. 14, 2013

(87) PCT Pub. No.: WO2012/156772
PCT Pub. Date: Nov. 22, 2012

(65) Prior Publication Data
US 2014/0091174 A1  Apr. 3, 2014

(51) Int. Cl.
B64C 13/30 (2006.01)
F16C 1/22 (2006.01)

(52) U.S. Cl.
CPC .. *B64C 13/30* (2013.01); *F16C 1/22* (2013.01)

(58) Field of Classification Search
CPC ........... B64C 13/30; F16C 1/223; F16C 1/22; F16H 7/12; F16H 7/14; F16H 2007/0882; F16H 7/1281; Y10T 74/20408
See application file for complete search history.

(56) References Cited

U.S. PATENT DOCUMENTS

| | | |
|---|---|---|
| 2,308,669 A | 1/1943 | Beed |
| 2,395,261 A | 2/1946 | Findley |
| 2,409,800 A | 10/1946 | Rockafellow |
| 3,183,737 A | 5/1965 | Matz |
| 3,197,159 A | 7/1965 | Crowfoot |
| 3,327,552 A | 6/1967 | Broders et al. |
| 3,709,056 A | 1/1973 | Stauber et al. |
| 3,901,464 A | 8/1975 | Arnstein et al. |
| 3,954,231 A | 5/1976 | Fraser |
| 4,142,699 A | 3/1979 | Arnquist et al. |
| 4,151,756 A | 5/1979 | Binder et al. |

(Continued)

FOREIGN PATENT DOCUMENTS

| CN | 1882474 A | 12/2006 |
|---|---|---|
| CN | 201045075 Y | 4/2008 |

(Continued)

OTHER PUBLICATIONS

International Search Report and Written Opinion dated Mar. 8, 2012, for International Patent Application No. PCT/IB2011/001084.

(Continued)

*Primary Examiner* — Thomas Diaz
(74) *Attorney, Agent, or Firm* — Thomas & Karceski, PC

(57) ABSTRACT

A cable support apparatus for an aircraft cable control system comprises at least one cable support unit. The cable support unit includes a pulley adapted to carry a cable of the aircraft cable control system, a support link with a first joint between the pulley and the support link and a second joint between the support link and the structure of the aircraft, and a compensation link connected with the structure of the aircraft. The thermal expansion of the compensation link causes a displacement of the support link. An aircraft and a method for maintaining a tension of a cable of a cable control system of an aircraft are also provided.

20 Claims, 3 Drawing Sheets

(56) References Cited

U.S. PATENT DOCUMENTS

| | | |
|---|---|---|
| 4,243,189 A | 1/1981 | Ohgi |
| 4,842,570 A * | 6/1989 | Niebling ........................ 474/118 |
| 4,902,268 A | 2/1990 | Hertrich et al. |
| 5,806,806 A | 9/1998 | Boehringer et al. |
| 5,924,331 A | 7/1999 | Pohling |

FOREIGN PATENT DOCUMENTS

| | | | |
|---|---|---|---|
| CN | 101484355 A | 7/2009 | |
| DE | 2535676 A1 | 2/1977 | |
| DE | 4006366 A1 * | 9/1991 | .............. F02B 67/06 |
| GB | 533607 | 2/1941 | |
| GB | 557293 A * | 5/1942 | .............. B64C 13/30 |

OTHER PUBLICATIONS

Chinese Office Action dated Jan. 7, 2015 for Chinese Patent Application No. 201180070998.7.

Chinese Office Action dated Sep. 25, 2015, for Chinese Patent Application No. 201180070998.7.

Chinese Office Action dated Apr. 13, 2016, for Chinese Patent Application No. 201180070998.7.

* cited by examiner

APPARATUS AND METHOD FOR MAINTAINING A TENSION IN A CABLE CONTROL SYSTEM

CROSS-REFERENCE TO RELATED APPLICATION(S)

This is a National Stage Entry into the United States Patent and Trademark Office from International PCT Patent Application No. PCT/IB2011/001084, having an international filing date of May 19, 2011, the entire content of which is incorporated herein by reference.

FIELD OF THE APPLICATION

The present application relates to cable control systems, for instance of the type found in vehicles such as aircraft, and to an apparatus and method for generally maintaining a tension therein.

BACKGROUND OF THE ART

In aircraft, cable control systems are commonly used to direct pilot maneuvers to the ailerons, elevator, and/or rudder. Thermal instabilities are present in aircraft due to the variation of temperatures as the aircraft travel at various altitudes, and thermal instabilities between the cables of the cable control is systems and the surrounding structure have been addressed by incorporating devices known as thermal compensators. Prior-art thermal compensators use mechanisms (e.g., with springs) to react to thermal instabilities, and hence maintain a relatively stable tension in the cables of the cable control systems. Shortcomings of such devices are cost, weight and sensitivity to application.

U.S. Pat. No. 2,409,800, issued on Oct. 22, 1946 to Rockafellow, discloses a temperature change compensating apparatus. This apparatus uses a scissoring mechanism to apply scissoring forces on a cable of a cable control system. The scissoring forces are induced by the change of length of a cable and pulley assembly, resulting from thermal variations. The cable pulls on the scissoring mechanism.

The apparatus of Rockafellow is voluminous, and therefore adds a non-negligible amount of weight to the vehicle using same. It does not offer the possibility of using some existing components of the cable control system.

Considering that aircraft now commonly incorporate different types of materials that do not react similarly to thermal variations, such as composite materials and metallic components, there results an increase in thermal instabilities between materials that are used in broad temperature ranges. Using the above example, composite material specifically has a small coefficient of thermal expansion, while high-strength lightweight alloys have medium to large coefficients, thereby causing different expansions and contractions, which may enhance thermal instabilities.

SUMMARY OF THE APPLICATION

It is therefore an aim of the present disclosure to provide a novel cable support apparatus for maintaining a tension in a cable control system.

It is a further aim of the present disclosure to provide a novel method for maintaining a tension in a cable control system.

Therefore, in accordance with a first embodiment, there is provided a cable support apparatus for an aircraft cable control system, comprising: at least one cable support unit comprising: a pulley adapted to carry a cable of an aircraft cable control system; a support link connecting the pulley to a structure of an aircraft; a first joint between the pulley and the support link for rotation of the pulley about the support link; a second joint between the support link and the structure of the aircraft, allowing the displacement of a center of rotation of the pulley relative to the structure as a result of movement of the support link; and a compensation link connected between the structure of the aircraft and the cable support unit for a thermal expansion of the compensation link to cause a displacement of the support link.

Further in accordance with the first embodiment, the compensation link is connected to a first end of the support link, and the pulley is connected to a second end of the support link, with the second joint being positioned between the first end and the second end of the support link.

Still further in accordance with the first embodiment, two cable support units are provided for a single one of the compensation link.

Still further in accordance with the first embodiment, the support links of the two cable support units are arranged and rotatably interconnected by a joining link to form a quasi four-bar mechanism.

Still further in accordance with the first embodiment, the compensation link is connected to one of the support link and the joining link.

Still further in accordance with the first embodiment, the joining link is made of a composite material.

Still further in accordance with the first embodiment, the support link is a body of a servo, with a rotation of the pulley being actuated by the servo.

Still further in accordance with the first embodiment, the compensation link is connected at opposed ends to the body of the servo, and to a center of rotation of an output quadrant.

Still further in accordance with the first embodiment, the compensation link is made of a metallic alloy.

Still further in accordance with the first embodiment, the compensation link is connected to the structure and to the support link by rotational joints.

Still further in accordance with the first embodiment, the first joint and the second joint are rotational joints.

In accordance with a second embodiment, there is provided an aircraft comprising: a structural element; a cable control system; a cable support unit comprising: a pulley carrying a cable of the cable control system; a support link connecting the pulley to the structure element; a first joint between the pulley and the link for rotation of the pulley about the link; a second joint between the support link and the structure element, allowing the displacement of a center of rotation of the pulley relative to the structure as a result of movement of the support link; and a compensation link connected between the structure element and the cable support unit for a thermal expansion of the compensation link to cause a displacement of the support link.

Further in accordance with the second embodiment, the compensation link is connected to a first end of the support link, and the pulley is connected to a second end of the support link, with the second joint being positioned between the first end and the second end of the support link.

Still further in accordance with the second embodiment, two cable support units are provided for a single one of the compensation link.

Still further in accordance with the second embodiment, the support links of the two cable support units are arranged and rotatably interconnected by a joining link to form a quasi four-bar mechanism.

Still further in accordance with the second embodiment, the compensation link is connected to one of the support link and the joining link.

Still further in accordance with the second embodiment, the joining link is made of a composite material.

Still further in accordance with the second embodiment, the support link is a body of a servo, with a rotation of the pulley being actuated by the servo.

Still further in accordance with the second embodiment, the compensation link is connected at opposed ends to the body of the servo, and to a center of rotation of an output quadrant.

Still further in accordance with the second embodiment, the compensation link is made of a metallic alloy.

Still further in accordance with the second embodiment, the compensation link is connected to the structure element and to the support link by rotational joints.

Still further in accordance with the second embodiment, the first joint and the second joint are rotational joints.

In accordance with a third embodiment, there is provided a method for maintaining a tension of a cable of a cable control system of an aircraft, the method comprising: rollingly supporting the cable taut on at least one cable support unit; in response to a thermal variation, changing a length of the cable and a length of a compensation link operatively connected between a structure of the aircraft and the at least one cable support unit; and modifying a position of the at least one cable support unit proportionally to the change of the length of the compensation link.

Further in accordance with the third embodiment, modifying a position of the at least one cable support unit comprises modifying a position of two of the cable support unit with the change of length of the compensation link.

BRIEF DESCRIPTION OF DRAWINGS

For a better understanding of the present invention, as well as other aspects and further features thereof, reference is made to the following description which is to be used in conjunction with the accompanying drawings, where.

DESCRIPTION OF PREFERRED EMBODIMENTS

Figure 1:
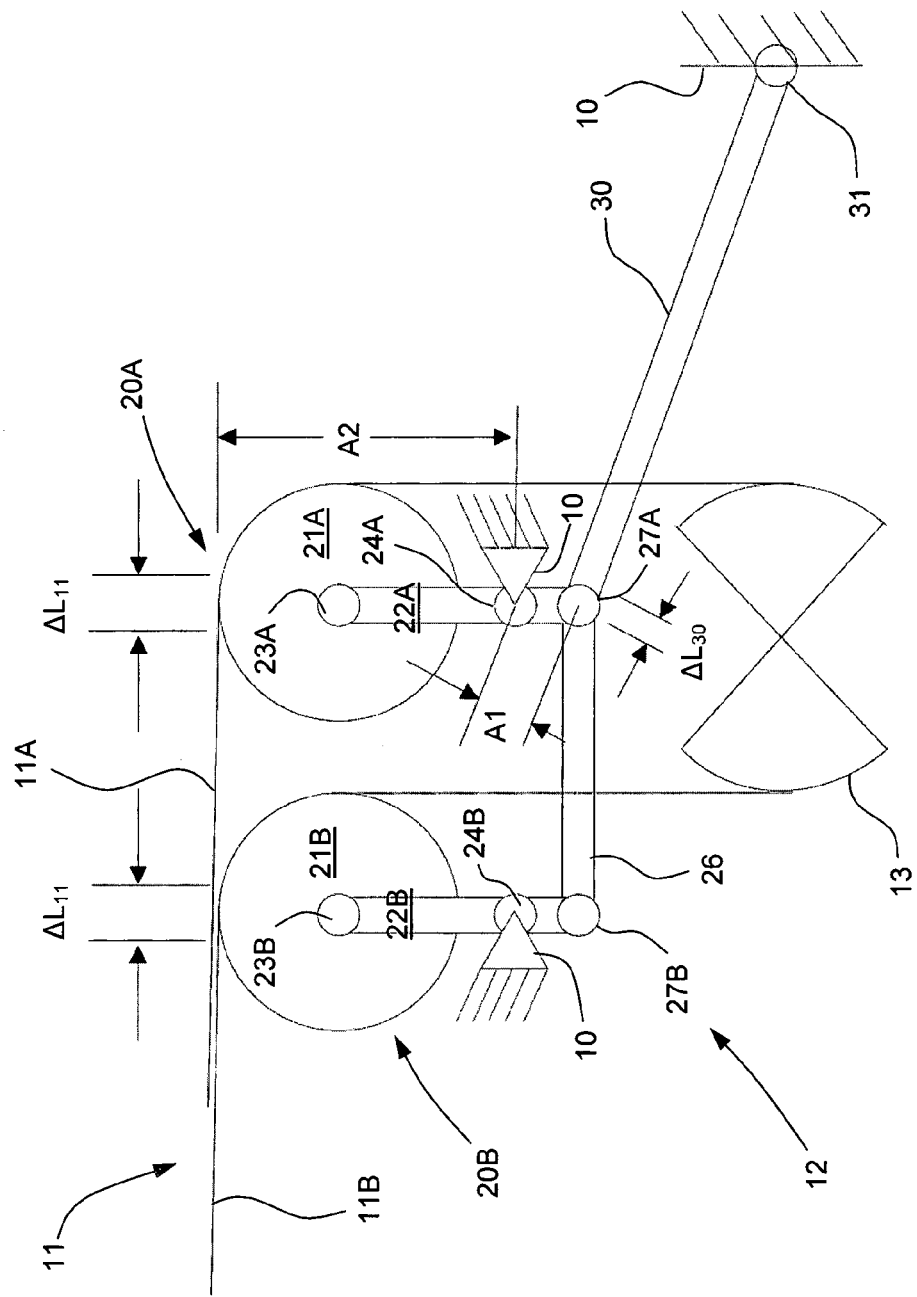
FIG. 1 is a schematic view of a cable support apparatus having a pair of cable support units, in accordance with a first embodiment of the present application.

Referring to the drawings, and more particularly to FIG. 1, a cable 11 of a cable control system is shown relative to structural parts 10 of an aircraft. The cable 11 may be part of a circuit and, therefore, includes cable portions 11A and 11B in FIG. 1. It is pointed out that the cable control system may be used in any possible vehicle or equipment operated by cables, and for which thermal variations may affect the tension in the cable.

The cable 11 extends between an input component (e.g., control column, pedals, etc.) and an output component (e.g., aileron mechanism, elevator mechanism, rudder mechanism, etc.). Although not shown, the cable 11 is supported relative to the aircraft structure 10 by pulleys and like components, to allow transmission of an input on the cable 11 to the output.

A cable support apparatus 12 also interfaces the cable 11 to the aircraft structure 10. The cable support apparatus 12 adjusts a tension in the cable 11 as a response to thermal expansion/contraction of the cable 11. For illustrative purposes, a quadrant 13 (representing an input) is shown as being interfaced with the cable 11. It is understood that other components (support pulleys, the output, etc.) could be illustrated as well, but are not for simplicity purposes.

Still referring to FIG. 1, the cable support apparatus 12 has a pair of cable support units 20, respectively illustrated as units 20A and 20B, with letters "A" and "B" being affixed as a function of the relation to cable portions 11A and 11B. Although a pair of the units 2 are shown in FIG. 1, the cable support apparatus 12 may have a single one or numerous of the cable support units 20. For simplicity purposes, reference to the cable support unit 20 of FIG. 1 will be made hereinafter, and will refer to both the cable support unit 20A and the cable support unit 20B.

Each of the cable support unit 20 has a pulley 21 mounted at an end of a support link 22. A joint 23 operatively connects the pulley 21 to the support link 22 and is typically a bearing or any other component or configuration allowing the rotation of the pulley 21 relative to the support link 22 (e.g., pivot, axle, etc.) Moreover, a joint 24 relates the support link 22 to the aircraft structure 10. Accordingly, the support link 22 pivots about joint 23, in which case the pulley 21 is in a satellite relation with respect to the aircraft structure 10 at the joint 24. Joints 23 and 24 are illustrated as rotational joints, but may be other types of joints if the cable support unit 20 is adequately configured relative to the cable 11.

A joining link 26 common to both cable support units 20 interrelates the support links 22A and 22B by way of joints 27A and 27B. Therefore, the support links 22A and 22B and the joining link 26 currently form with the joints the equivalent of a four-bar mechanism in that the support links 22 are generally parallel to one another and move concurrently. The joining link 26 may expand or contract because of thermal variations, which would likely cause relative movement between the support links 22, thereby affecting the parallel relation between the support links 22—whereby the four-bar mechanism may be referred to as a quasi four-bar mechanism. In an embodiment, the joining link 26 may consist of a material having a relatively low coefficient of thermal expansion, to lessen any impact on the four-bar mechanism. For example, the joining link 26 may be made of composite material. However, the joining link 26 may also be made of other materials having a greater coefficient of thermal expansion. Again, joints 27 are illustrated as rotational joints, but may be other types of joints if the cable support unit 20 is adequately configured relative to the cable 11.

A compensation link 30 is connected to one of the joints (joint 27A in FIG. 1) at its first end, and is connected to the structure 10 by a second joint 31 at an opposed end. The compensation link 30 is made of a material specifically selected to expand/contract to displace the pulleys 21 and compensate in tension for a variation in length in the cable 11. The expression "compensation" is used as the link 30 will compensate for an expansion/contraction of the cable 11 resulting from a thermal variation, by expanding or contracting as well.

Referring to FIG. 1, the above-referred cable support apparatus 12 will react in the following manner:

$$\Delta L_{11} = L_{11} - AT \cdot \tau_{11} \qquad (1)$$

-continued $$\Delta L_{30} = L_{30} \cdot \Delta T \cdot r_{30} \quad (2)$$

$$\frac{\Delta L_{30}}{A1} = \frac{AL_{11}}{A2} \quad (3)$$

where:
- $\Delta L_{11}$=change in length of cable 11 with change in temperature
- $L_{11}$=length of cable 11
- $AL_{30}$=change in length of compensation link 30 with change in temperature
- $L_{30}$=length of compensation link 30
- $\Delta T$=temperature variation
- A 1=reaction arm
- A 2=cable arm
- $\tau_{11}$=coefficient of thermal expansion of cable 11
- $\tau_{30}$=coefficient of thermal expansion of compensation link 30.

The cable support apparatus 12 is therefore designed, sized, and installed taking into consideration the various parameters of equations (1), (2) and (3).

In an embodiment, the cable 11 and the compensation link 30 may have the same coefficient of thermal expansion. For instance, if there is a lack of space, the material of the compensation link 30 may be selected so as to have a coefficient of thermal expansion greater than that of the cable 11. As another alternative, as shown in FIG. 1, multiple cable support units 20 may be used concurrently, to apply multiple opposing forces to counterbalance the change in length.

Accordingly, referring concurrently to FIGS. 1 and 2, the method 40 for adjusting the tension in the cable 11 of a cable control system of an aircraft comprises the sequence described below. In FIG. 1, the cable 11 is supported by the pair of cable support units 20, although other embodiments may use a single cable support unit 20, or more than two cable support units 20. For simplicity purposes, the method 40 will be described as operational with the cable support apparatus 12 of FIG. 1. Moreover, the method 40 will be described as featuring steps. While the methods and system disclosed herein will be described and shown with reference to particular steps performed in a particular order, it will be understood that these steps may be combined, sub-divided, or re-ordered to form an equivalent method without departing from the teachings of the present invention. Accordingly, the order and grouping of the steps is not a limitation of the present invention.

According to step 41, the cable 11 is in a taut state by being rollingly supported by the cable support units 20, and by the various components of the cable control system. In FIG. 1, the cable 11 is supported by the pair of cable support units 20, although other embodiments may use a single cable support unit 20, or more than two cable support units 20.

When thermal variation occurs, as illustrated in step 42, there results a change of length (i.e., thermal expansion or contraction) of a given magnitude in the cable 11 and a change of length of the compensation link 30.

However, as illustrated at step 43, due to the compensation link 30 changing in length, the position of the cable support units 20 is modified, proportionally to the change of length of the compensation link 30. There will result the maintaining of the tension of the cable 11. Following the above-mentioned equations (1)-(3), the size and material of the compensation link 30 are selected as a function of the particulars of the cable 11, so as to maintain a relatively uniform tension in the cable despite thermal variations. It is pointed out that the action of maintaining the tension may nonetheless include some variations in the tension of the cable.

In the embodiment of FIG. 1, the cable support apparatus advantageously shares the same compensation link 30. This is achieved via the joining link 26, among other possibilities. Any other suitable arrangement of links may be used to share a single compensation link 30, such as a scissor mechanism, etc.

Figure 3:
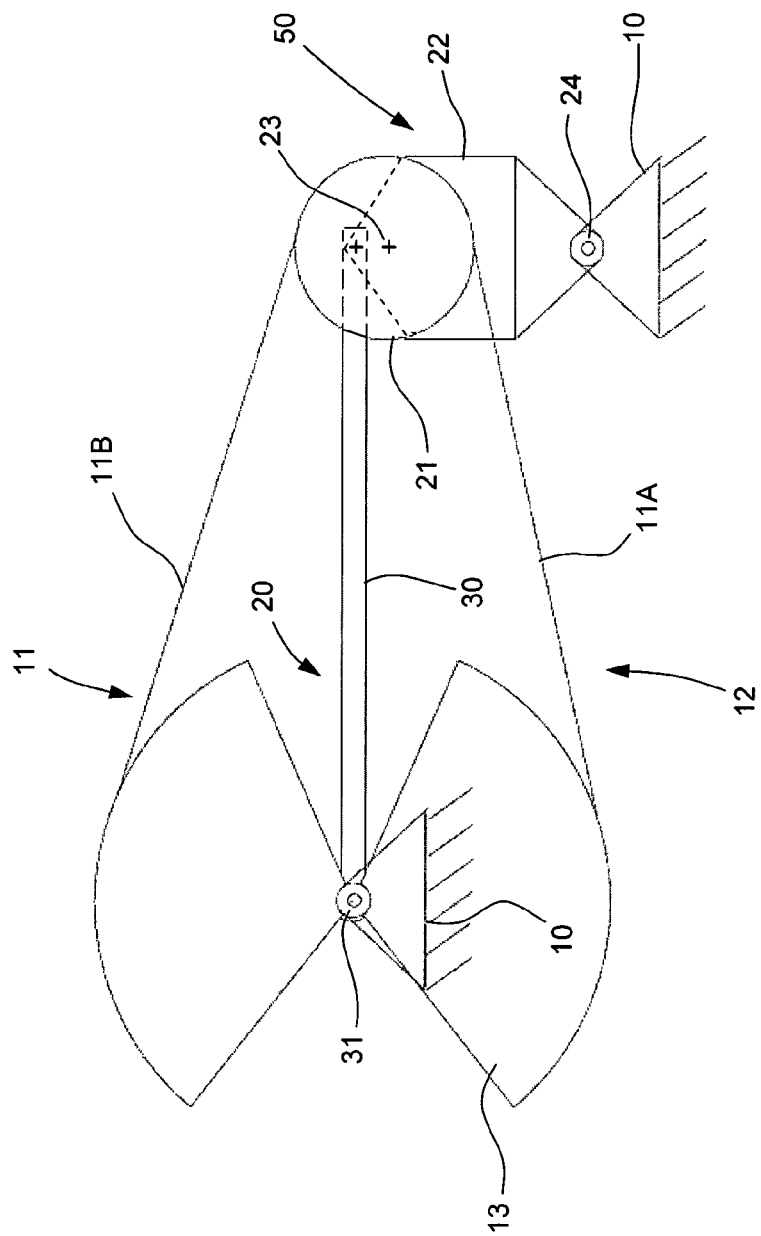
FIG. 3 is a schematic view of a cable support apparatus with a servo used as a cable support unit, in accordance with a second embodiment of the present disclosure.

Referring to FIG. 3, there is illustrated an alternative embodiment of the cable support apparatus 12. In the cable control system of the embodiment of FIG. 3, the quadrant 13 illustrates the output, while a servo 50 is the input (e.g., autopilot servo), with the cable 11 forming a circuit between the quadrant 13 and the servo 50. The cable support unit 20 has components that are part of a servo 50. Like elements in the embodiments of FIGS. 1 and 3 will bear like reference numerals.

The pulley 21 of the cable support unit 20 is part of the servo 50. The servo 50 is pivotally mounted to the aircraft structure 10 at the joint 24, whereby the body of the servo 50 forms the link 22. The joint 23 between the pulley 21 and the servo 50 allows the rotation of the pulley. The joint 23 is typically an actuated joint, such as an output shaft of a motor that is part of the servo so. Other embodiments are considered as well.

The compensation link 30 extends from a connection point with the aircraft structure 10, to the servo 50. As schematically illustrated in FIG. 3, the compensation link 30 is connected to the servo 50 so as to displace the body 22 of the servo about the joint 24. Although not shown in the illustrated embodiment, the compensation link 30 may be connected to a center of the pulley 21, while not interfering with the rotation of the pulley 21. Also, in the illustrated embodiment, the joint 31 of the compensation link 30 shares an axis of rotation with the quadrant 13. In such a case, the coefficient of thermal expansion of the compensation link 30 is greater than that of the cable 11, considering that the cable 11 will have both portions 11A and 11B expand/contract.

Figure 2:
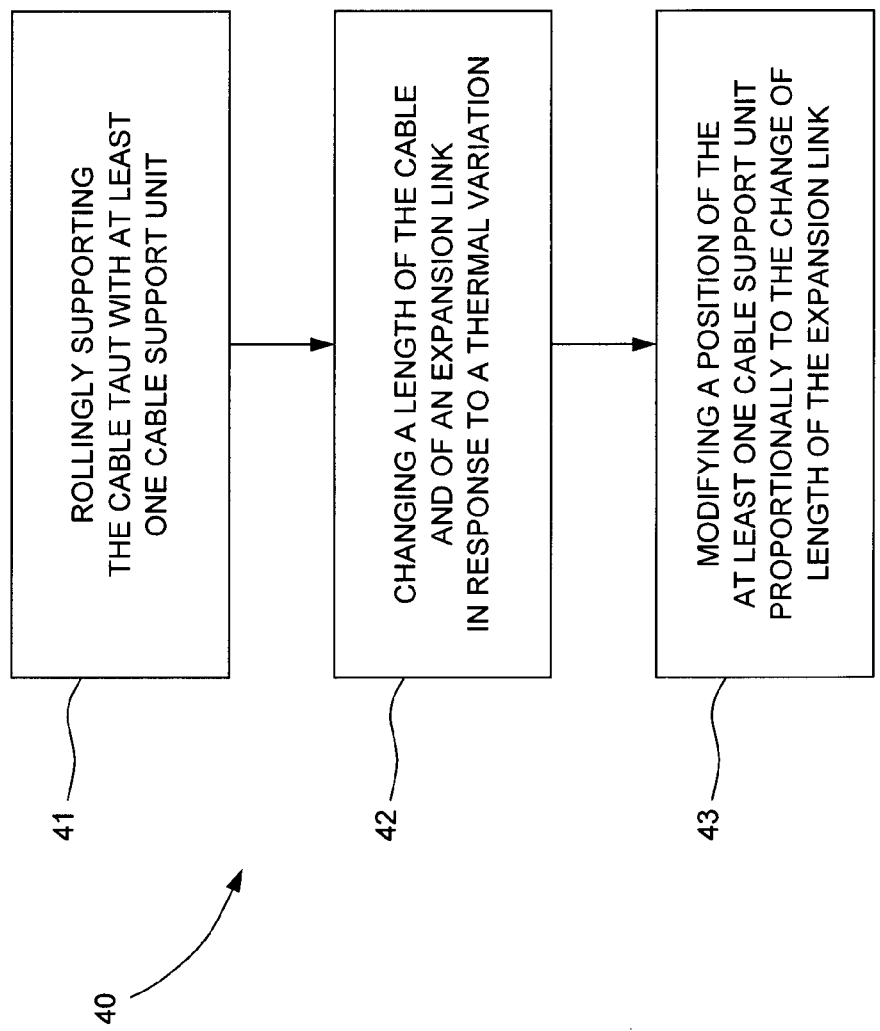
FIG. 2 is a flow chart of a method for maintaining a tension in a cable of a cable control system.

In the embodiments of FIGS. 1-3, the pulleys 21 may already be required as part of the cable control system to rollingly support the cable 11. Accordingly, the cable support units 20 may be used as substitutes for idler pulleys (i.e., pulleys in a fixed relation with the aircraft structure) that are part of an existing cable control system. Moreover, the material used for the compensation link 30 is typically a high-strength low-weight metallic alloy. In both cases, the cable support units 20 are configured to lessen their impact on the weight of the aircraft.

Is it pointed out that the term "link" is used in the present disclosure to generally designate a rigid component. It is understood that "link" may refer to a pair of rigid components interconnected by inactive joints, etc.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

The invention claimed is:

1. A cable support apparatus for an aircraft cable control system, comprising:
    at least one cable support unit comprising:
        a pulley adapted to carry a cable of an the aircraft cable control system;
        a support link connecting the pulley to a structure of an aircraft;

a first joint between the pulley and the support link for rotation of the pulley about the support link;

a second joint between the support link and the structure of the aircraft, allowing the displacement of a center of rotation of the pulley relative to the structure as a result of movement of the support link; and a compensation link connected between the structure of the aircraft and the cable support unit for a thermal expansion of the compensation link to cause a displacement of the support link, wherein the compensation link comprises a compensation link material with a first coefficient of thermal expansion and the cable comprises a cable material with a second coefficient of thermal expansion, and wherein the first coefficient of thermal expansion is greater than the second coefficient of thermal expansion, whereby expansion and contraction of the compensation link displaces the pulley, thereby compensating for variations in a length of the cable.

2. The cable support apparatus according to claim 1, wherein the compensation link is connected to a first end of the support link, and the pulley is connected to a second end of the support link, with the second joint being positioned between the first end and the second end of the support link.

3. The cable support apparatus according to claim 1, further comprising two of the cable support unit for a single one of the compensation link.

4. The cable support apparatus according to claim 3, wherein the support links of the two cable support units are arranged and rotatably interconnected by a joining link to form a quasi four-bar mechanism.

5. The cable support apparatus according to claim 4, wherein the compensation link is connected to one of the support link and the joining link.

6. The cable support apparatus according to claim 4, wherein the joining link is made of a composite material.

7. The cable support apparatus according to claim 1, wherein the support link is a body of a servo, with a rotation of the pulley being actuated by the servo.

8. The cable support apparatus according to claim 7, wherein the compensation link is connected at opposed ends to the body of the servo, and to a center of rotation of an output quadrant.

9. The cable support apparatus according to claim 1, wherein the compensation link is made of a metallic alloy.

10. An aircraft comprising:
a structural element;
a cable;
a cable control system; and
a cable support unit comprising:
  a pulley carrying a the cable of the cable control system;
  a support link connecting the pulley to the structure element;
  a first joint between the pulley and the link for rotation of the pulley about the link;
  a second joint between the support link and the structure element, allowing the displacement of a center of rotation of the pulley relative to the structure as a result of movement of the support link; and
  a compensation link connected between the structure element and the cable support unit for a thermal expansion of the compensation link to cause a displacement of the support link, wherein the compensation link comprises a compensation link material with a first coefficient of thermal expansion and the cable comprises a cable material with a second coefficient of thermal expansion, and wherein the first coefficient of thermal expansion is greater than the second coefficient of thermal expansion, whereby expansion and contraction of the compensation link displaces the pulley, thereby compensating for variations in a length of the cable.

11. The aircraft according to claim 10, wherein the compensation link is connected to a first end of the support link, and the pulley is connected to a second end of the support link, with the second joint being positioned between the first end and the second end of the support link.

12. The aircraft according to claim 10, further comprising two of the cable support unit for a single one of the compensation link.

13. The aircraft according to claim 12, wherein the support links of the two cable support units are arranged and rotatably interconnected by a joining link to form a quasi four-bar mechanism.

14. The aircraft according to claim 13, wherein the compensation link is connected to one of the support link and the joining link.

15. The aircraft according to claim 13, wherein the joining link is made of a composite material.

16. The aircraft according to claim 10, wherein the support link is a body of a servo, with a rotation of the pulley being actuated by the servo.

17. The aircraft according to claim 16, wherein the compensation link is connected at opposed ends to the body of the servo, and to a center of rotation of an output quadrant.

18. The aircraft according to claim 10, wherein the compensation link is made of a metallic alloy.

19. The aircraft according to claim 10, wherein the compensation link is connected to the structure element and to the support link by rotational joints.

20. A method for maintaining a tension of a cable of a cable control system of an aircraft, the method comprising:
rollingly supporting the cable taut on at least one cable support unit;
in response to a thermal variation, changing a length of the cable and a length of a compensation link operatively connected between a structure of the aircraft and the at least one cable support unit; and
modifying a position of the at least one cable support unit proportionally to the change of the length of the compensation link, wherein the compensation link comprises a compensation link material with a first coefficient of thermal expansion and the cable comprises a cable material with a second coefficient of thermal expansion, and wherein the first coefficient of thermal expansion is greater than the second coefficient of thermal expansion, whereby expansion and contraction of the compensation link displaces the cable support unit, thereby compensating for variations in a length of the cable.

* * * * *